No. 665,491. Patented Jan. 8, 1901.
G. P. WASHBURN.
ACETYLENE GAS GENERATOR.
(Application filed Jan. 29, 1900.)
(No Model.) 2 Sheets—Sheet 2.
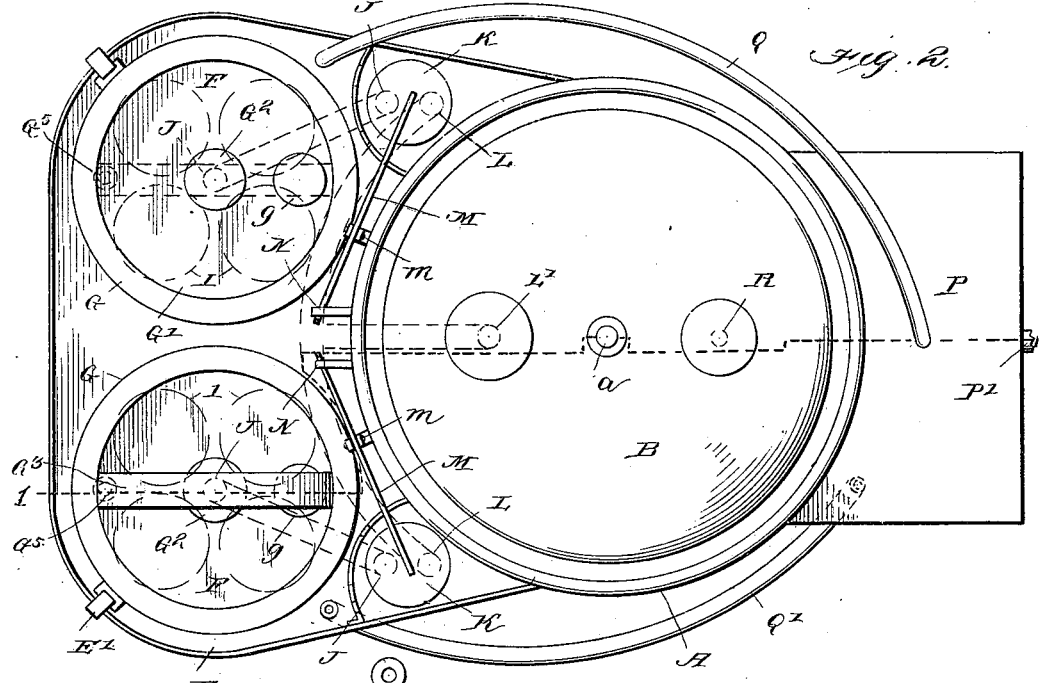
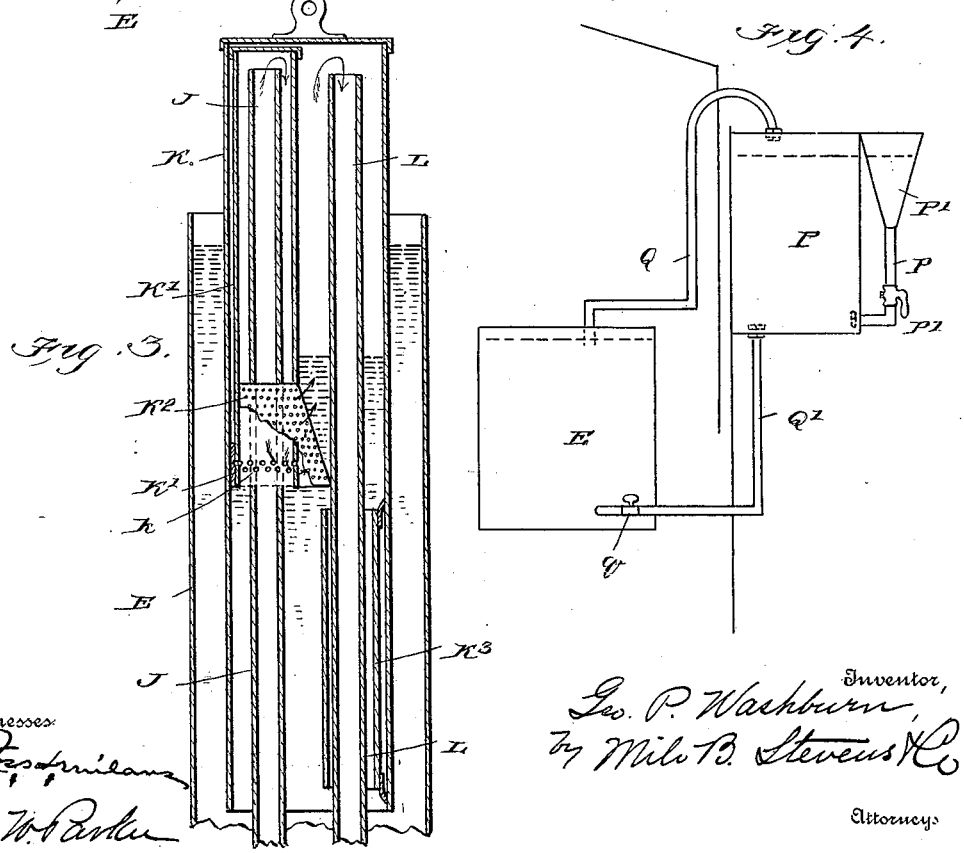

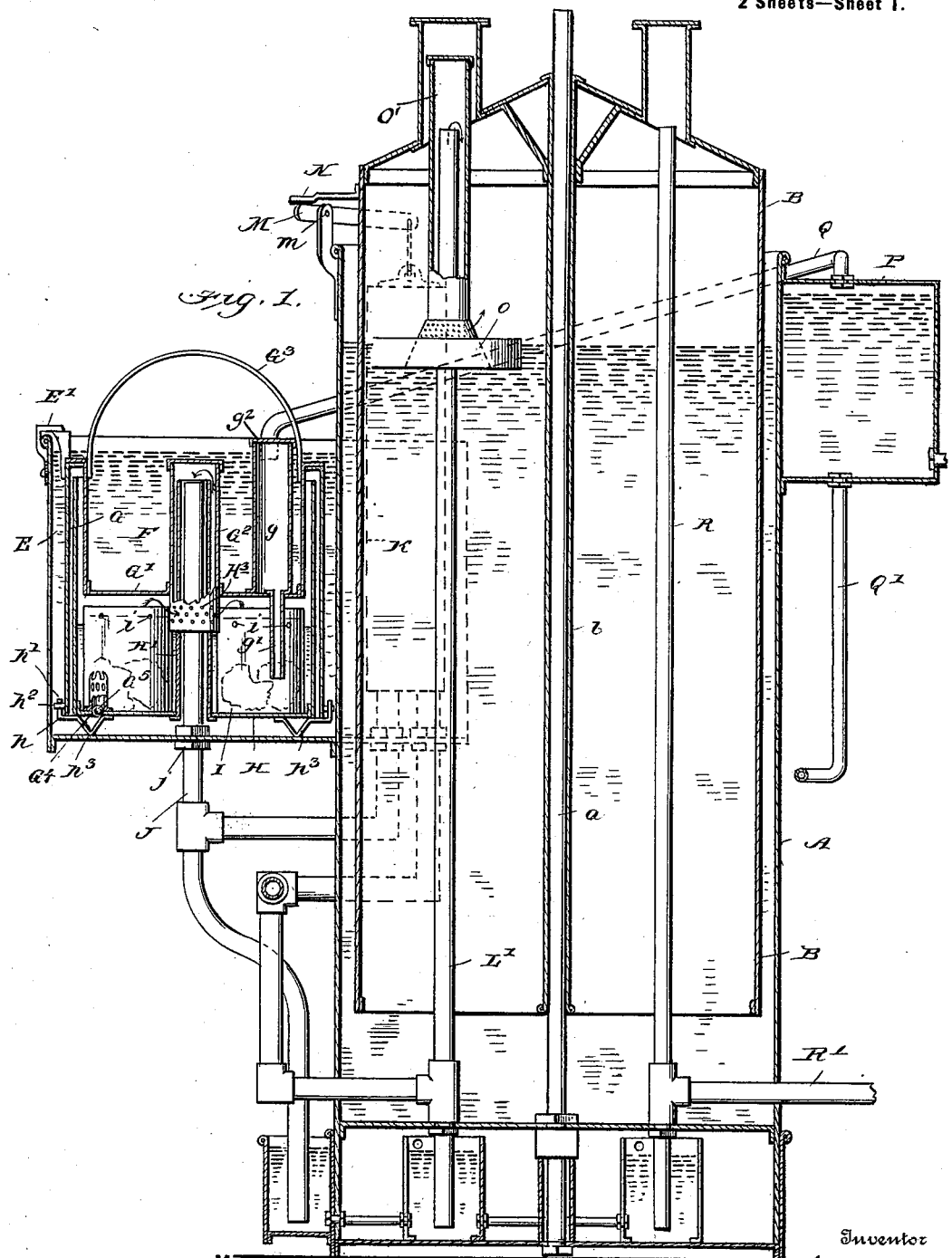

UNITED STATES PATENT OFFICE.

GEORGE P. WASHBURN, OF CHADRON, NEBRASKA.

ACETYLENE-GAS GENERATOR.

SPECIFICATION forming part of Letters Patent No. 665,491, dated January 8, 1901.

Application filed January 29, 1900. Serial No. 3,193. (No model.)

*To all whom it may concern:*

Be it known that I, GEORGE P. WASHBURN, a citizen of the United States, residing at Chadron, in the county of Dawes and State of Nebraska, have invented certain new and useful Improvements in Acetylene-Gas Generators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The present invention relates to improvements in acetylene-gas generators, and has for its object, among other things, to provide an apparatus which shall be automatic in the regulation of the generation of the gas and which does away with all valves or similar mechanical constructions.

A further object of the invention is to so construct the apparatus that the generation of the gas will be regulated by means controlled by a very slight or almost imperceptible movement of the gasometer-bell, so that the latter does not have to rise and fall a great distance, as is common in many acetylene-gas-generating apparatus.

A further object is to control the generation of the gas by means of a novel and original pressure-regulator, whereby the generation is thoroughly controlled and an even generation of the gas effected by the pressure of the gas generated acting on the fluid fed to the carbid to generate the gas.

A further object of the invention is to construct an apparatus of a very compact and simple nature which will be especially effective.

A further object is to generally improve and simplify the construction of acetylene-gas apparatus.

With such objects in view the invention comprises the several novel parts, arrangement, and combinations of parts hereinafter described, and particularly set forth in the claims.

In the accompanying drawings I have shown for the purpose of an understanding of the invention one form of the apparatus embodying my improvements, but desire it understood that I do not wish to limit the invention to the particular construction herein shown.

In the drawings, Figure 1 is a vertical sectional view through the gasometer and generating-tank on the line 1 1 of Fig. 2. Fig. 2 is a plan view of the apparatus shown in Fig. 1. Fig. 3 is an enlarged vertical sectional view of the pressure-regulator. Fig. 4 is a diagrammatic view illustrating the water-supply and connections for the trough E.

Referring to the drawings, wherein similar reference characters refer to similar parts throughout the several views, A indicates the tank, and B the movable bell, of a gasometer. The tank A has extending up through the same a vertical guide rod or member $a$, which is secured in suitable manner at the base of the tank—as, for instance, as illustrated in the accompanying drawings. This rod passes up through a tubular bearing sleeve or tube $b$, depending from the gasometer-bell, the tube $b$ being firmly secured to the top of the bell in any preferred or desired manner. The guide-rod $a$ and sleeve $b$ constitute the guiding means for the gasometer-bell in its rising-and-falling movement.

E indicates a trough or tank which is preferably, in order to make the apparatus compact, secured to one side of the tank A of the gasometer. This tank is relatively large and is adapted to contain and support the various parts of the generator of the apparatus. In the trough or tank E is supported what I term a "generator combination bell and tank," (indicated at F.) This device comprises an inverted tank or bell (indicated at G) and a base (indicated at H) which is in the form of a receptacle, on which the bell G sets and to which it is secured by a suitable means, as the holding-locks, (indicated at $h$,) which locks may be of any desired or convenient style—for instance, as shown in the drawings, in which the angular member $h'$, secured to one of the parts, is adapted to engage over a projecting lug or arm $h^2$ on the other. The walls of the receptacle or pan H extend up within the bell G a considerable distance, as shown above, a horizontal diaphragm or partition G' dividing the bell into the lower generator proper and upper water-chamber. These two parts communicate with each other by means of a tube or pipe $g'$, conveniently secured to the diaphragm $G'$ and depending into the receptacle or pan H, near the bottom thereof. Surrounding the end of the pipe $g$ in the water-chamber is a tube $g$, having a loose cap $g^2$, permitting the escape of air. The receptacle or pan H may be provided, if desired, with suitable supporting-legs, (indicated at $h^3$.) Secured conveniently in a central location to the bottom of the pan H is a vertical tube $H'$, extending up into a similar tube $G^2$, secured to the partition $G'$, the tube $G^2$ having an upper cover or cap, as shown. The tube $G^2$, near its lower end and just below the partition $G'$, is provided with a perforation or perforations $H^3$, through which the gas generated in the lower partition of the generator-bell finds access into the tubes $H'$ $G^2$, which constitute practically a continuous tube. Located in the pan H of the generator is one or more carbid-containing receptacles or cups, (indicated at I.) I have shown in the drawings four of these cups in the pan. Each cup I is provided at or near its top with a water-inlet opening or openings, (indicated at $i$.) It will be observed in this connection that the inlet-holes $i$ of each cup are on different horizontal planes from those of the other cups, the holes in the cups being at only slightly-different heights. The bell G has attached to the same a bail or handle $G^3$, by which the combined generator tank and bell may be removed from the trough or tank E.

$E'$ indicates a lock device of any desired or preferred form for holding the generator in the trough and to prevent the lifting or floating of the same.

It will be observed from the drawings that I have shown two of the combined generator tanks and bells located in the trough E. They being similar, the description of one will serve for the understanding of both.

J indicates a pipe which extends up through the bottom of the trough E, to which it is conveniently secured by a bushing or water-tight connection $j$, into the alined tubes $H'$ $G^2$ to near the top thereof. This pipe J or a branch thereof extends to and enters the pressure-regulator, to be presently described.

The regulator, which is shown at K, comprises an inverted bell or large tube which is closed at its upper end. At or near its upper end and inside thereof the tube or bell K is provided with a smaller tube or bell $K'$, which is closed at its upper end and at or near its lower end is provided with perforations or holes (indicated at $k$.) Surrounding and conveniently secured to the lower portion of the tube $K'$ is a perforated screen or baffle $K^2$, which in shape is generally conical. At or near its lower end and inside thereof the bell K is provided with a sleeve or guiding-tube $K^3$, which is secured to the bell K in any suitable manner. Extending up into the tube K and also to near the top of the inner tube $K'$ is the pipe J from the generator or a branch thereof, the pipe being open at its upper end and adapted to discharge the gas from the generator into the smaller tube $K'$.

L indicates a pipe which extends vertically up through the sleeve $K^3$ to near the top of the bell K, being open at its upper end. This pipe is adapted to receive the gas from the bell K and conduct the same to the gasometer, the pipe being shown as extending down from the pressure-regulator and entering the lower part of the gasometer-tank and having a vertical extension or branch $L'$ extending up into the gasometer-bell. It will be observed that the pressure-regulator bell K is immersed in water contained in the trough or tank E, the regulator being shown as placed in a partitioned chamber of the tank E, to which the water of the tank is admitted. Pivoted to the tank A of the gasometer at $m$ is a lever (indicated at M) which has one end extending adjacent to and connected, as by a link, to the upper part of the pressure-regulator bell K. The other end of the lever extends adjacent to and beneath a lug or bracket N, carried by the gasometer-bell, the arrangement being such that the depression of one end of the lever by the lug or bracket N when the gasometer-bell drops will raise the other end, and with it the regulator-bell K.

O indicates a float check-valve and gas-washer, which is shown as provided with an upwardly-extending closed sleeve $O'$, guided on and extending above the top of the vertical pipe $L'$. This check-valve and washer need not be particularly described, as any suitable form may be provided, the one employed being such as described in my application, Serial No. 733,426, filed October 12, 1899.

It will be observed from the drawings that I have shown two of the pressure-regulators K, one being for each generator; also, two operating-levers and connections, one for each regulator. The construction of these regulators are the same and each one is connected to one generator, as above described.

For the purpose of automatically maintaining water in the trough or tank E at the requisite height I have shown in the accompanying drawings a tank P, which is supported in any preferred manner, as by being secured to the gasometer-tank A above the desired level of the water in the trough or tank E. This water-supply tank P is provided with a suitable filling-funnel $P'$, connected by a pipe $p$ to the lower part of the tank P, the pipe $p$ being provided with a cut-off cock or valve $p'$. From the upper part of the tank P, which is a closed tank, extends a pipe Q to the tank E, entering the same and extending thereinto slightly below the desired level of the water in the tank. The bottom of the tank P is connected, as by a pipe $Q'$, to the lower part of the tank or trough E. This pipe Q is also provided with a cock or valve, (indicated at $q$.)

R indicates a pipe extending from above the top of the gasometer-tank and opening at its upper end into the gasometer-bell, said pipe being connected, as by a branch R', to the gas-main or service-pipe. The pipe R, as well as the inlet-pipe L' to the gasometer and the pipe J from the generator to the pressure-regulator, is provided with a depending branch entering a cup provided with water, forming a water seal, the branches being for the purpose of carrying off the liquid of condensation or solid impurities from the gas-pipes, thus preventing the filling of pipes and stopping the flow of gas.

Such being the construction and arrangement of the several parts of the apparatus, it is intended to operate in substantially the following manner: Carbid is placed in each of the carbid-cups I in the receptacle or pan H of the generator, the bell being secured to the pan and the combined pan and bell of the generator being immersed in the water in the trough or tank E and secured therein by means of the lock device E', as above described. Water will then enter the lower chamber of the generator-bell through the inlet, which is indicated at $G^4$ and which is controlled by a ball check-valve $G^5$, the latter permitting the water to enter the lower compartment of the bell, but preventing it discharging from or running back into the trough from the bell. The water will rise in the lower compartment above the lower end of pipe $g'$ until it reaches the holes in one of the carbid-cups, through which it will flow into the carbid-cup having the lowest holes and cause the generation of the gas. The gas generated from the cups will pass through the openings $H^2$ into the tubes $H'$ $G^2$, and will enter through the upper open end into the pipe J, through which it passes to the upper part of the pressure-regulator, as indicated by the arrows. From the regulator the gas enters the pipe L, passing through the same into the gasometer. While the gas is generating to the desired extent, the pressure in the lower compartment of the generator will force the water down below the lowest openings of the carbid-receptacles and cause it to pass through the tube $g'$ into the tube $g$ in the upper compartment of the generator, and the water will not rise again to the openings until the generation of the gas has decreased and the pressure has decreased to the extent sufficient to permit the rising of the water to the lowest openings. Thus the feed of the water to the carbid in the receptacle having the lowest openings will be controlled as long as the generation of the gas continues. When, however, the carbid in the first receptacle I, or the receptacle having the lowest holes, has expended itself and generates no more gas and the volume in the gasometer has been reduced by the consumption of gas or drawing off of the same into the main, the bell B lowers slightly, almost to an imperceptible degree, but sufficient to cause the bracket or lug N, carried by the gasometer-bell, to lower one end of one of the levers M, thus raising the other end of the lever, and with it the bell of the pressure-regulator. By thus raising the bell of the pressure-regulator greater space is provided between the surface of the water therein and the top of the bell, thereby reducing the pressure in the regulator. This reduction in the regulator through the pipe J reduces also the pressure in the lowest compartment of the generator and permits the water therein to rise again until it reaches the next higher feed-openings in a carbid-receptacle in the generator, through which it passes to the carbid therein, again causing the generation of gas. This generation of the gas will again increase the pressure in the generator and in the regulator and control the supply of water to the carbid, as above, until the carbid in the second receptacle is expended, when again the gasometer-bell will lower and again trip the lever and raise the regulator-bell, again causing the reduction of the pressure in the generator and in the regulator-bell, permitting the water to rise to the next higher feed-openings in another carbid-receptacle. The operation continues until all of the carbid in the several receptacles has been expended.

The operation of the second generator and regulator is the same as that above described, but the parts being so located that the second generator is not brought into operation until after the carbid in all of the receptacles in the first generator have been expended. It will be observed that the holes $k$ in the lower part of the tube $K'$ of the regulator are relatively larger than the openings in the screen $K^2$ surrounding the lower part of the tube $K'$, the object of which is to permit the ready escape of the gas from the tube $K'$ into the water in the regulator, the smaller openings of the screen acting to finely divide or break up the gas-bubbles and thoroughly wash the gas. The operation of the automatic supply for the tank E, it is believed, will be readily understood. As soon as the water in the tank E falls below the lower open end of the pipe Q air will enter the same and through the pipe pass into the upper tank P, causing the feed of water through the pipe Q' into the tank E until the water again rises to the end of the pipe Q and shuts off the air-inlet. The valve $q$ in the pipe Q' remains open until it is necessary to fill the tank P, when the valve $q$ is closed.

Having thus described the invention, what I claim as new, and desire to secure by Letters Patent, is—

1. The combination, in a gas-generating apparatus, of a gasometer, a gas-generator, a pressure-regulator, a pipe connecting the generator with said regulator, a pipe connecting said regulator with the gasometer, a water-supply, and means adapted to operate the pressure-regulator upon the sinking of the gasometer, said regulator when operated, reducing the pressure in the generator and permitting the feed of liquid to the generator, substantially as described.

2. In a gas-generating apparatus, the combination of a gasometer, a liquid-supply tank, a generator to which the liquid passes from said tank, a pressure-regulator bell having its lower end immersed in liquid, a pipe adapted to conduct gas from said generator to said regulator-bell, a pipe adapted to conduct gas from said regulator-bell to said gasometer and means adapted to be operated by the sinking of the gasometer for raising said regulator-bell to reduce the pressure in said generator, substantially as described.

3. In a gas-generating apparatus, the combination of a gasometer, a gas-generator, a conductor for the gas from said generator to said gasometer, a pressure-regulator interposed between said gasometer and said generator, and adapted to receive gas from the generator, and means for operating said regulator automatically to decrease the pressure therein, substantially as described.

4. In a gas-generating apparatus, the combination of a gasometer, a liquid-tank, a generator located in said tank and communicating therewith, a pressure-regulator bell having its open end immersed in the liquid in said tank, a pipe connecting said generator with said bell, a pipe connecting said bell with said gasometer, and means operated by the sinking of the gasometer for raising said regulator-bell, to effect a reduction of pressure in the generator, substantially as described.

5. In an acetylene-gas-generating apparatus, the combination of a gasometer having a movable bell, a water-tank, a gas-generator F located in said water-tank and divided into two compartments, the upper of which connects with said tank, a tube depending into said lower compartment and effecting connection between the two compartments, of two carbid-receptacles in said lower compartment each having water-inlets, the inlets of one receptacle being above the inlet of the other receptacle, a pressure-regulator bell having its lower end immersed in the liquid in said tank, a pipe for conveying said gas to said pressure-regulator, a pipe for conveying the gas from said pressure-regulator to said gasometer, means operated by the movement of said gasometer-bell for lifting said regulator-bell to reduce the pressure in said generator when the carbid in the receptacle having the lowest inlets has been expended to permit the feeding of the liquid in the next carbid-receptacle, substantially as described.

6. In a gas-generating apparatus, the combination of a generator, a pressure-regulator, means for conducting gas from said generator to said pressure-regulator, a gasometer, means for conducting gas from said regulator to said gasometer, means for operating said regulator to reduce the pressure in said generator, and a liquid-supply controlled by the pressure in said generator, substantially as described.

7. In a gas-generating apparatus, the combination of a gasometer, a liquid-supply tank, a generator to which the liquid passes from said tank, a pressure-regulator bell having its lower end immersed in liquid, a pipe adapted to conduct gas from said generator to an inner tube of said regulator-bell, the inner tube of said regulator-bell to conduct gas from chamber of the inner tube to the chamber of said regulator-bell, a pipe adapted to conduct gas from the said chamber of the pressure-regulator to the gasometer, means adapted by sinking of the gasometer to raise the pressure-regulator also said inner tube which is a part of the pressure-regulator thereby reducing the pressure in said generator, substantially as described.

In testimony whereof I affix my signature in presence of two witnesses.

GEORGE P. WASHBURN.

Witnesses:
V. A. JOHNSTON,
G. T. H. BABCOCK.